US012609128B2

(12) United States Patent
Shen

(10) Patent No.: US 12,609,128 B2
(45) Date of Patent: Apr. 21, 2026

(54) METHOD FOR IMPROVING FAR-FIELD SPEECH INTERACTION PERFORMANCE, AND FAR-FIELD SPEECH INTERACTION SYSTEM

(71) Applicant: ESPRESSIF SYSTEMS (SHANGHAI) CO., LTD., Shanghai (CN)

(72) Inventor: Xiaozheng Shen, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 125 days.

(21) Appl. No.: 18/696,802

(22) PCT Filed: Sep. 28, 2022

(86) PCT No.: PCT/CN2022/122192
§ 371 (c)(1),
(2) Date: Mar. 28, 2024

(87) PCT Pub. No.: WO2023/051622
PCT Pub. Date: Apr. 6, 2023

(65) Prior Publication Data
US 2024/0386902 A1 Nov. 21, 2024

(30) Foreign Application Priority Data
Sep. 28, 2021 (CN) .......................... 202111173645.1

(51) Int. Cl.
*G10L 15/22* (2006.01)
*G10L 15/30* (2013.01)
(Continued)

(52) U.S. Cl.
CPC .......... *G10L 21/0264* (2013.01); *G10L 15/30* (2013.01); *G10L 25/21* (2013.01); *G10L 2021/02082* (2013.01)

(58) Field of Classification Search
None
See application file for complete search history.

(56) References Cited

U.S. PATENT DOCUMENTS 7,440,891 B1 * 10/2008 Shozakai ................ G10L 15/20
704/226
9,595,997 B1 * 3/2017 Yang ........................ H04B 3/23
(Continued)

FOREIGN PATENT DOCUMENTS

CN 105427860 A 3/2016
CN 107680586 A 2/2018
(Continued)

OTHER PUBLICATIONS

International Search Report and Written Opinion from corresponding PCT Application No. PCT/CN2022/122192 with English Translation Apr. 6, 2023.

*Primary Examiner* — Shreyans A Patel
(74) *Attorney, Agent, or Firm* — Aird & McBurney LP

(57) ABSTRACT

A method for improving far-field speech interaction performance, and a far-field speech interaction system are provided. The method comprises: a smart device, during a network configuration process by soundwave signals, acquires a soundwave transmitted by a network configuration auxiliary device, and calculates a spatial acoustic parameter where the smart device is located. Furthermore, numerical values of the spatial acoustic parameter are selected within a set margin range, front-end speech processing parameter is updated according to the spatial acoustic parameter, and a soundwave signal energy value after front-end speech processing is calculated so that a spatial (Continued)

acoustic parameter corresponding to the minimum energy value is selected as a final spatial acoustic parameter. The final spatial acoustic parameter is transmitted to a speech recognition engine which selects an acoustic model trained by using a data set closest to the final spatial acoustic parameter as a far-field speech recognition model.

16 Claims, 3 Drawing Sheets

(51) Int. Cl.

| *G10L 21/0264* | (2013.01) |
|---|---|
| *G10L 25/21* | (2013.01) |
| *G10L 21/0208* | (2013.01) |

(56) References Cited

U.S. PATENT DOCUMENTS

| 2013/0156211 A1* | 6/2013 | Hwang | H04M 9/082 |
|---|---|---|---|
| | | | 381/66 |
| 2015/0371655 A1* | 12/2015 | Gao | G10K 11/16 |
| | | | 704/226 |
| 2019/0362711 A1 | 11/2019 | Nosrati | |
| 2021/0098015 A1* | 4/2021 | Pandey | H04M 9/082 |
| 2024/0386902 A1* | 11/2024 | Shen | G10L 21/0208 |

FOREIGN PATENT DOCUMENTS

| CN | 210578573 U | | 5/2020 | |
|---|---|---|---|---|
| CN | 111312269 A | | 6/2020 | |
| CN | 111341303 A | | 6/2020 | |
| CN | 111527543 A | * | 8/2020 | H04M 9/08 |
| CN | 113921007 A | * | 1/2022 | G10L 21/0208 |

* cited by examiner

METHOD FOR IMPROVING FAR-FIELD SPEECH INTERACTION PERFORMANCE, AND FAR-FIELD SPEECH INTERACTION SYSTEM

CROSS-REFERENCE TO RELATED APPLICATIONS

This application is the U.S. National Phase Application under 35 U.S.C. § 371 of International Patent Application No. PCT/CN2022/122192 filed on Sep. 28, 2022, which claims priority to Chinese Patent Application CN202111173645.1 filed on Sep. 28, 2021. The disclosures of the aforementioned applications are hereby incorporated by reference in their entireties.

TECHNICAL FIELD

The present application mainly relates to the field of far-field speech interaction, and in particular, to a method for improving far-field speech interaction performance and a far-field speech interaction system.

BACKGROUND ART

With the continuous development of technology, numerous smart devices appear in people's life and work, such as smart speakers, smart cars, etc. These smart devices often have the function of far-field speech interaction, enabling voice assistants in complex environments. However, due to the complexity and variability of environments in which the users are located, it is difficult for the core algorithms in existing speech interaction systems to achieve excellent performance in all user scenarios.

There are two main types of speech interaction systems in the industry, one is composed of a front-end speech signal processing module and a back-end speech wake-up and recognition module, and the other is an end-to-end speech recognition and wake-up system. Considering users' requirements with regard to delay and stability for wake-up word detection, the wake-up module is generally deployed at the device side. However, due to the limited computing power of embedded devices, especially the large gap in computing power when compared to the cloud, a wake-up module on a device side often has limitations on the size of the wake-up model.

For better speech interaction performance, some manufacturers adopt some adaptive speech recognition methods in the speech recognition module. However, the performance of these methods in noise scenarios and local playback scenarios still needs to be improved.

In order to improve the effect of the speech interaction system, the performance of far-field speech interaction will be considerably improved if spatial acoustic parameters of rooms may be obtained in the design of far-field speech interaction schemes. For example, when performing simulation of speech data sets in an end-to-end speech recognition system, a corresponding transfer function may be specified, or an optimal filter length may be obtained in the acoustic front-end design, etc.

Chinese patent CN107452372A provides a training method for far-field speech recognition, wherein a certain amount of near-field speech data is extracted from a near-field speech data set by means of transcription within a room, and far-field audio is obtained by means of re-recording, and then segmented far-field speech features are extracted from the obtained far-field audio, and the far-field speech features and the near-field speech features are blended according to a set ratio, where a far-field speech recognition model is ultimately trained based on the blended speech feature data.

This patent can acquire a large amount of far-field speech data mixed with room noise and device reverberation by simulating training data, and then train a far-field speech recognition model with a high recognition rate. This method has a certain effect on improving the far-field speech recognition performance. However, it is difficult to have very large coverage in the process of simulating the data set of far-field speech, and the spatial acoustic parameters of each room vary a lot due to the differences in size, wall reflection coefficient, etc. Therefore, it is impossible for this transcription method to cover most scenarios. In addition, there is a lack of guarantees and mathematical explanations for the generalization ability of neural network models for speech recognition to obtain superior results in all acoustic environments.

Chinese patent CN109523999A provides a front-end processing method and system for improving far-field speech recognition, wherein by calculating a room impulse response signal, a segmentation time point of an early reverberation signal and a late reverberation signal is obtained, and a direct sound signal and the early reverberation signal are convolved with clean speech signals from a speech library in the time domain to obtain a time domain target signal; the time domain target signal and other signals in time domain mixed signals except the time domain target signal are calculated separately to obtain target signal energy and other signals energy, and an ideal ratio mask is obtained from the target signal energy and the other signals energy; and after the time domain mixed signal is converted into a frequency domain mixed signal, the amplitude of the frequency domain mixed signal is multiplied by the ideal ratio mask, and then the phase of the frequency domain mixed signal is used to obtain a reconstructed signal.

This patent improves the speech recognition rate by removing late reverberation in the process of front-end processing, which plays a certain role in the speech interaction process but has disadvantages in highly reverberant scenarios. Due to the obvious difference in frequency domain phase between clean speech signals and speech signals with reverberance in highly reverberant scenarios, simply multiplying the amplitude of the original signal by the gain coefficient and then multiplying it by the phase of the original signal does not result in a perfect restoration of the clean speech. Moreover, this method brings nonlinear distortion as well as musical noise, which causes a certain decline in recognition rate for speech recognition models that rely on speech features.

In response to the above problems, the present application provides a method for improving far-field speech interaction performance, which utilizes audio signals emitted by a smart device in a soundwave network configuration stage to calculate the spatial acoustic parameters of the space where the smart device is located, and optimizes the far-field speech interaction performance based on the calculated spatial acoustic parameters. The present application utilizes the soundwave network configuration in the initialization stage of a smart device to obtain spatial acoustic parameters of the space where the smart device is located, and implementing the spatial acoustic test in connection with the network configuration process to facilitate user operations. In addition, the present application updates the acoustic front-end speech processing algorithm of the device based on the spatial acoustic parameters, which can improve the accuracy of mathematical modeling of the front-end speech processing. Meanwhile, by updating the speech recognition engine in the cloud based on the spatial acoustic parameters, the matching degree of the training data set for the acoustic model can be improved.

SUMMARY

In response to the above problems, the object of the present application is to provide a solution for improving far-field speech interaction performance.

In one aspect of the present application, a method for improving far-field speech interaction performance is provided, which includes: cyclically performing the following steps S1 to S6 by N times, wherein N is a natural number not less than 2:

Step S1: receiving a network configuration soundwave signal of a predetermined length of time in a process of network configuration; step S2: performing front-end speech processing on the network configuration soundwave signal based on front-end speech processing parameter; wherein the front-end speech processing includes echo cancellation, and the front-end speech processing parameter includes a length of an echo cancellation filter; step S3: calculating an energy value $E_n$ of the network configuration soundwave signal processed by the front-end speech processing in step S2 within the current cycle; step S4: determining whether the current cycle is a first cycle, and if so, calculating an initial spatial acoustic parameter $P_{initial}$ based on the network configuration soundwave signal received in step S1, and proceeding to step S5; if not, proceeding directly to step S5; step S5: determining a numerical value of a spatial acoustic parameter $P_{n+1}$ in the next cycle by combining a preset upper limit margin and a preset lower limit margin, such that the numerical value of $P_{n+1}$ satisfies $(P_{initial}-M_1) \leq P_{n+1} \leq (P_{initial}+M_2)$, wherein n is the sequence number of the current cycle, $M_1$ is the preset lower limit margin, and $M_2$ is the preset upper limit margin; step S6: updating the front-end speech processing parameter using the spatial acoustic parameter $P_{n+1}$ obtained in step S5 for the next cycle; after that the N cycles are completed, proceeding to step S7: determining a minimum value $E_{min}$ among the network configuration soundwave signal energy values obtained in the N cycles, and taking a spatial acoustic parameter in the cycle corresponding to the minimum value $E_{min}$ as a final spatial acoustic parameter.

Preferably, the front-end speech processing parameter further includes a length of a beam forming filter.

Optionally, step S2 includes: determining whether the current cycle is a first cycle, and if so, performing front-end speech processing on the network configuration soundwave signal based on initial value of the front-end speech processing parameter; if not, performing front-end speech processing on the network configuration soundwave signal based on the front-end speech processing parameter updated in the previous cycle.

Optionally, step S3 further includes determining whether the current cycle is the Nth cycle, and if so, proceeding to step S7.

Preferably, transmitting the final spatial acoustic parameter to a speech recognition engine stored locally or in the cloud, and the speech recognition engine selects, from a plurality of acoustic models, an acoustic model trained by using a data set closest to the final spatial acoustic parameter as a far-field speech recognition model.

Preferably, in step S5, a stepwise increasing method is adopted to determine the numerical value of the spatial acoustic parameter $P_{n+1}$ in the next cycle such that the value of $P_{n+1}$ satisfies $(P_{initial}-M_1) \leq P_n \leq P_{n+1}$.

Preferably, in step S5, a stepwise decreasing method is adopted to determine the numerical value of the spatial acoustic parameter $P_{n+1}$ in the next cycle such that the numerical value of $P_{n+1}$ satisfies $P_{n+1} \leq P_n \leq (P_{initial}+M_2)$.

Preferably, in step S5, a stepwise refining method with a fixed-step size is adopted to determine the numerical value of the spatial acoustic parameter $P_{n+1}$ in the next cycle, and the numerical value of the spatial acoustic parameter $P_{n+1}$ in the next cycle is determined based on the predetermined lower limit margin $M_1$ and a step size S, wherein $P_{n+1} = P_{initial}-M_1+(n-1)*S$; or the numerical value of the spatial acoustic parameter $P_{n+1}$ in the next cycle is determined based on the predetermined upper limit margin $M_2$ and the step size S, wherein $P_{n+1} = P_{initial}+M_1-(n-1)*S$.

Optionally, in step S4, calculating an initial spatial acoustic parameter $P_{initial}$ includes: adopting a steady noise cut-off method to calculate the initial spatial acoustic parameter $P_{initial}$.

Optionally, in step S6, updating the front-end speech processing parameter includes: updating the length of the echo cancellation filter to a value that is positively correlated with the spatial acoustic parameter obtained in step S5.

Further optionally, in step S6, updating the front-end speech processing parameter further includes: updating the length of the beam forming filter to a value that is positively correlated with the spatial acoustic parameter obtained in step S5.

Preferably, a network configuration soundwave signal energy value $E_1$ calculated in the first cycle corresponds to a spatial acoustic parameter $P_1$, wherein $P_1$ is determined based on the initial value of the front-end speech processing parameter.

In another aspect of the present application, a far-field speech interaction system is provided, which includes: a signal acquisition module for receiving a network configuration soundwave signal in the process of network configuration; a parameter calculation module for determining a spatial acoustic parameter based on the network configuration soundwave signal; an echo cancellation module for performing echo cancellation processing on the network configuration soundwave signal using an echo cancellation algorithm; a model selection module for selecting a far-field speech recognition model based on the spatial acoustic parameter; a speech recognition module for receiving the network configuration soundwave signal processed by the echo cancellation module, and performing recognition analysis on the speech information based on the far-field speech recognition model selected by the model selection module; wherein, the echo cancellation module acquires a spatial acoustic parameter from the parameter calculation module, and determines a length of the echo cancellation filter based on the spatial acoustic parameter.

Optionally, the far-field speech interaction system further includes an energy calculation module for calculating an energy value of the network configuration soundwave signal; wherein, the energy calculation module acquires the length of the echo cancellation filter from the echo cancellation module and the network configuration soundwave signal processed by the echo cancellation module, and calculates the energy value of the network configuration soundwave signal.

Optionally, the signal acquisition module is a microphone array; the far-field speech interaction system further includes a beam forming module for performing beam forming processing on the network configuration soundwave signal processed by the echo cancellation module using a beam forming algorithm; wherein, the beam forming module acquires a spatial acoustic parameter from the parameter calculation module, and determines a length of the beam forming filter based on the spatial acoustic parameter.

Optionally, the far-field speech interaction system further includes an energy calculation module for calculating an energy value of the network configuration soundwave signal; wherein, the energy calculation module acquires the length of the beam forming filter and the network configuration soundwave signal processed by the beam forming module from the beam forming module, and calculates the energy value of the network configuration soundwave signal.

Optionally, the far-field speech interaction systems further includes: the parameter calculation module acquiring energy values of a plurality of network configuration soundwave signals from the energy calculation module; determining a minimum energy value in the energy calculation module, and setting a spatial acoustic parameter corresponding to the minimum energy value as a final spatial acoustic parameter.

Optionally, the model selection module further includes: acquiring the final spatial acoustic parameter from the parameter calculation module, and based on the final spatial acoustic parameter, selecting an acoustic model trained by using a data set closest to the final spatial acoustic parameter as a far-field speech recognition model.

Optionally, the spatial acoustic parameter is a room reverberation coefficient.

Optionally, the parameter calculation module calculates the spatial acoustic parameter adopting a steady noise cut-off method.

In yet another aspect of the present application, a computer-readable storage medium with a computer program stored thereon is provided, when executed by a processor, the computer program implements the method for improving far-field speech interaction performance.

In yet another aspect of the present application, a terminal device is provided, which includes a processor, a memory, and a computer program stored on the memory and executable on the processor. The processor is configured to execute the method for improving far-field speech interaction performance.

With the rapid development of the Internet of Things and AI technology, more and more smart hardware, such as smart speakers, are actively appearing in various smart home scenarios. Networking becomes a necessity as numerous smart hardware plays intelligent roles in smart home scenarios. The traditional network configuration method requires that the device has a screen with input function such that the account (SSID) and password of a wireless network can be entered directly on the screen. As smart devices become progressively smaller, more and more of them no longer have input-enabled screens. An alternative network configuration method is soundwave network configuration, which utilizes the sound transmitted by a network configuration auxiliary device to transmit data and broadcast the SSID and password of the wireless network through sound, and a smart device can obtain the SSID and password by listening to the sound to carry out networking operation. Based on this soundwave network configuration method, the present application optimizes the far-field speech interaction performance and proposes a solution for improving far-field speech interaction performance, wherein the spatial acoustic parameter of the space where the smart device is located is calculated based on the network configuration soundwave signal received in the network configuration process, so as to optimize the far-field speech interaction signal. This solution can improve the accuracy of spatial acoustic parameter, as well as the accuracy of far-field speech recognition.

The present application at least overcomes the problems in the prior art caused by changes in the spatial environment to far-field speech recognition, that is, the speech recognition outcome cannot be guaranteed due to a mismatch between the speech recognition model and the spatial environment. The present application calculates the acoustic parameter of the space where the smart device is located, and then uses the calculated spatial acoustic parameter to optimize the far-field speech interaction signal. In the present application, the smart device can complete the measurement of spatial acoustic parameter through the soundwave signal in the process of soundwave network configuration without additionally obtaining measurement signals or data sets simulating far-field speech. In particular, for a speech recognition engine relying on a speech recognition model, the present application can obtain optimized speech recognition results even when the acoustic environment where the smart device is located changes.

It should be understood that the foregoing description of the background art as well as the summary of the application are merely illustrative and not limiting.

DETAILED DESCRIPTION OF THE PREFERRED EMBODIMENTS

The present application will be described more fully hereinafter with reference to the accompanying drawings which form part of the present disclosure and illustrate exemplary embodiments by way of illustration. It should be understood that the embodiments shown in the accompanying drawings and described below are merely illustrative and not intended to limit the present application.

Figure 1:
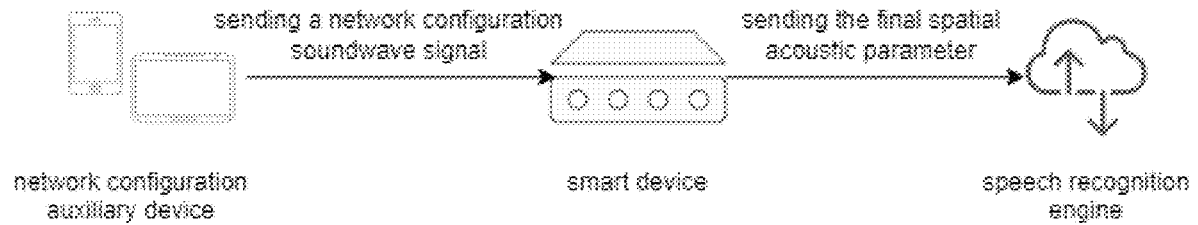
FIG. 1 is a schematic diagram of an application scenario for far-field speech interaction.

Before describing the technical solutions of the embodiments of the present application, the far-field speech interaction system of the embodiments of the present application is first described in conjunction with the accompanying drawings. Referring to FIG. 1, which is a schematic diagram of an application scenario provided by an embodiment of the present application. This application scenario includes network configuration auxiliary device, smart devices, and speech recognition engines. During the specific implementation of the embodiments of the present application, the network configuration auxiliary device is a communication device with wireless transceiver function, such as a computer, a smart phone, a tablet, etc.; the smart device may be a smart speaker, a smart home device, etc., which has one or more microphones or a microphone array for collecting voice commands; the speech recognition engine, stored in the local smart device or the cloud of the far-field speech interaction system, performs speech recognition on the speech signals acquires by the smart device based on a speech recognition model, thereby realizing the speech interaction function.

With reference to the above schematic diagram of the application scenario shown in FIG. 1, the specific embodiments of the present application are described below. According to the technical solution of the present application, three main scenarios are described below. Among them, scenario 1 is soundwave network configuration for smart devices; scenario 2 is front-end speech signal processing; scenario 3 is back-end speech recognition optimization.

Scenario 1: Soundwave Network Configuration for Smart Devices

With reference to FIG. 1, the following describes smart devices utilizing speech signals for soundwave network configuration.

The smart device in this embodiment performs soundwave network configuration in the initial stage of application to connect to a corresponding network. Wherein, the network configuration auxiliary device maps the characters to be recognized (such as the account SSID and password of a wireless network) into frequencies through the transmitter, and then maps each frequency into a corresponding syllable signal and then encodes it into audio (i.e., a network configuration soundwave signal) for playback; after receiving the audio signal from the network configuration auxiliary device, the smart device analyses the frequency of the audio signal, and then finds the characters corresponding to the frequency according to the code table, thereby decoding the data for networking.

Scenario 2: Spatial Acoustic Parameter Calculation and Front-End Speech Processing With reference to FIG. 2, the spatial acoustic parameter calculation and front-end speech processing of the smart device in this embodiment are described.

In one aspect of this embodiment, as an example but not a limitation, the smart device, in the process of network configuration via soundwave signals, acquires the soundwave played by the network configuration auxiliary device via the loudspeaker and, based on the soundwave, calculates the acoustic parameters of the space where the smart device is located. For example, a steady noise cut-off method may be adopted to obtain acoustic parameters by calculating the soundwave signals obtained from the smart device's own microphone. Furthermore, certain margins are set for the calculated spatial acoustic parameter, and a plurality of numerical values of the spatial acoustic parameter are selected within the margin range, and then the front-end speech processing parameter are updated according to the numerical values of the spatial acoustic parameter, and the soundwave signal energy values after the front-end speech processing are calculated, so as to select the spatial acoustic parameter corresponding to the minimum energy value as the final spatial acoustic parameter.

In another aspect of this embodiment, as an example but not a limitation, the front-end speech processing method of the smart device comprises echo cancellation, that is, filtering the speech signal through an echo cancellation filter. Furthermore, if the smart device uses a plurality of microphones or a microphone array, the front-end speech processing method of the smart device further comprises beam forming, that is, filtering the speech signal through a beam forming filter. It should be understood that at this time, the front-end speech processing parameter further comprise a length of the beam forming filter.

Figure 2:
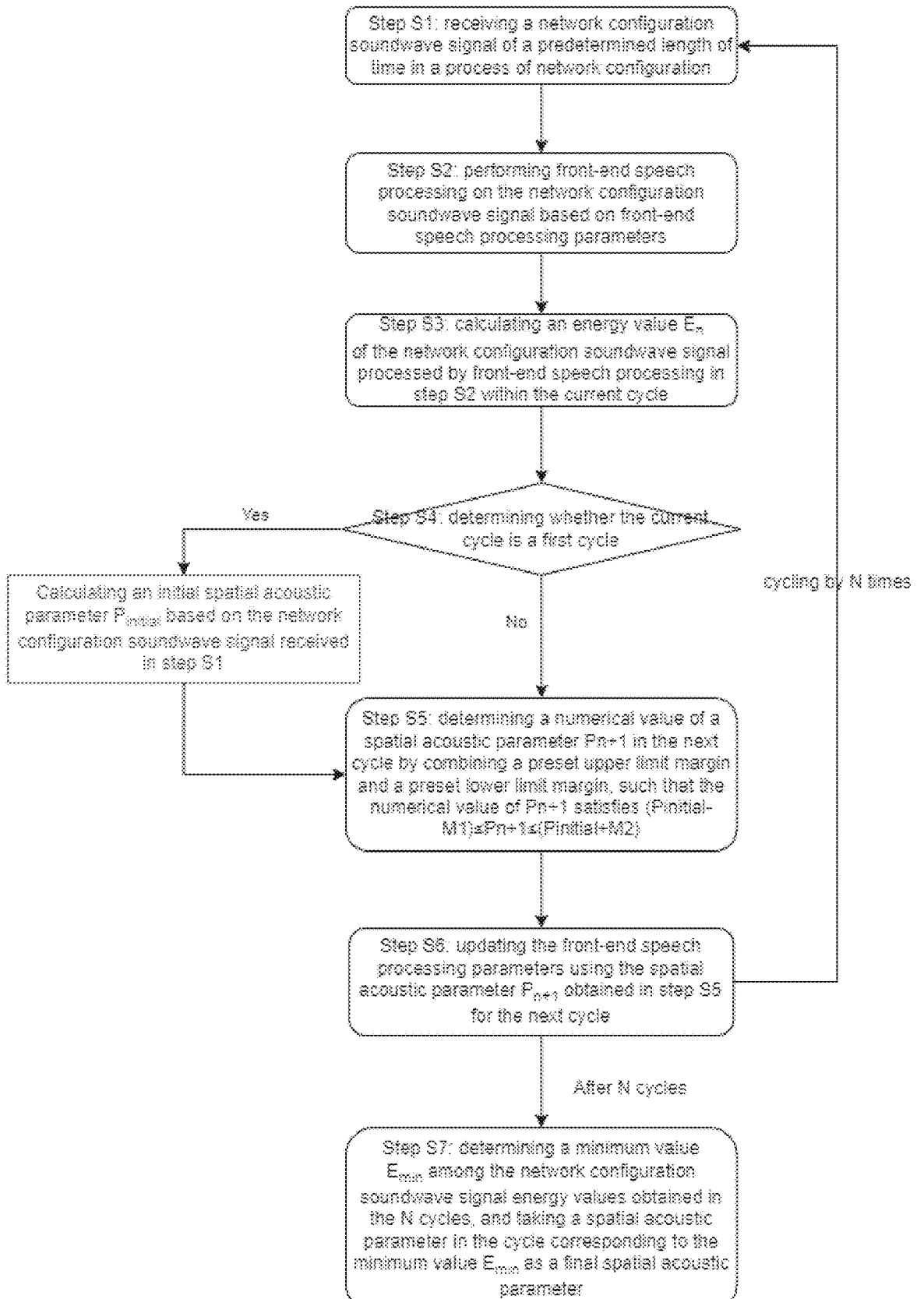
FIG. 2 is a schematic flow chart of spatial acoustic parameter calculation and front-end speech processing for a smart device according to an embodiment of the present disclosure.

FIG. 2 is a schematic flow chart of the method for improving far-field speech interaction performance according to this embodiment. As shown in FIG. 2, the method comprises: cyclically performing the following steps S1 to S6 by N times, wherein N is a natural number not less than 2:

step S1: receiving a network configuration soundwave signal of a predetermined length of time in a process of network configuration;

step S2: performing front-end speech processing on the network configuration soundwave signal based on front-end speech processing parameter; wherein the front-end speech processing comprises echo cancellation, and the front-end speech processing parameter comprise a length of an echo cancellation filter;

step S3: calculating an energy value $E_n$ of the network configuration soundwave signal processed by front-end speech processing in step S2 within the current cycle;

step S4: determining whether the current cycle is a first cycle, and if so, calculating an initial spatial acoustic parameter $P_{initial}$ based on the network configuration soundwave signal received in step S1, and proceeding to step S5; if not, proceeding directly to step S5;

step S5: determining a numerical value of a spatial acoustic parameter $P_{n+1}$ in the next cycle by combining a preset upper limit margin and a preset lower limit margin, such that the numerical value of $P_{n+1}$ satisfies $(P_{initial}-M_1) \leq P_{n+1} \leq (P_{initial}+M_2)$, wherein n denotes the sequence number of the current cycle, $M_1$ is the preset lower limit margin, and $M_2$ is the preset upper limit margin;

step S6: updating the front-end speech processing parameter using the spatial acoustic parameter $P_{n+1}$ obtained in step S5 for the next cycle;

after that the N cycles are completed, proceeding to step S7: determining a minimum value $E_{min}$ among the plurality of network configuration soundwave signal energy values obtained in the N cycles, and taking a spatial acoustic parameter in the cycle corresponding to the minimum value $E_{min}$ as a final spatial acoustic parameter.

It should be understood that the order of performing of the above steps S2, S3 and steps S4, S5 may be exchanged, that is, it is also possible to perform steps S4, S5 first, followed by steps S2, S3.

For example, the smart device periodically receives the network configuration soundwave signal according to a predetermined time length (for example, 1 s), for example, for a total of 6 cycles, namely cycle (a) to cycle (f), and performs the following steps:

Calculating the initial spatial acoustic parameter and calculating the energy of cycle (a): after receiving the soundwave signal of cycle (a), the smart device calculates the spatial acoustic parameter, wherein the acoustic parameter is RT60 which is used to measure the degree of signal attenuation in the room, and specifically represents the reverberation time (in milliseconds) for the signal to attenuate to 60 dB. It should be understood that the wall materials and space sizes of different rooms will have a certain impact on spatial acoustic parameters.

Specifically, a steady noise cut-off method is adopted to calculate the initial spatial acoustic parameter, and the steps of which include:

1. Playing the received network configuration soundwave of cycle (a), and ensuring that the receiving unit does not clip the amplitude (not more than 1), and the short-term amplitude of the signal from the receiving unit is greater than 0.5. It should be noted that too small a signal amplitude may make it difficult to accurately identify the RT60. The network configuration soundwave signal is a digital signal.

2. Collecting soundwaves using a microphone or microphone array, wherein the amplitude of the soundwave signal collected at each sampling point is recorded as $y_{(n)}$, and n is the sequence number of the sampling time. Wherein the sampling time is determined based on the sampling rate and the sampling cycle length. For example, it is assumed that the sampling cycle length is 1 second and the sampling rate is 16,000, then the sampling time is $1/16{,}000$, $2/16{,}000$, $3/16{,}000$, . . . , $16{,}000/16{,}000$.

3. Performing framing on the amplitude $y_{(n)}$ of the soundwave signal with a frame length of 1024 and a frame shift of 512 to obtain $y_{i_{(n)}}$, and i is the frame number. Wherein, the frame length represents the number of points sampled. For example, the frame length 1024 represents a total of 1024 sampling points.

4. Calculating the short-term energy of each frame $E_{(i)}$ $=10\times\log 10(\Sigma(y_{i(n)}\times y_{i(n)}))$, wherein the unit of $E_{(i)}$ is db.

5. Calculating the difference between the short-term energy $E_{(i)}$ of adjacent frames, $\Delta E_{(i)}=E_{(i)}-E_{(i-1)}$.

6. When $\Delta E_{(i)}$ is close to zero, pausing the playback of the network configuration soundwave and recording the time $t_1$ in milliseconds, and the short-term energy at this moment is $E_s$.

7. When $E_{(i)}=E_s-60$, recording the time $t_2$ at this moment.

8. Calculating the reverberation time $\Delta t=t_2-t_1$.

It should be understood that the network configuration soundwave signal itself is stable, but the received signal is unstable due to room reverberation. Therefore, the steady noise cut-off method acquires the spatial acoustic parameter of the room by observing how long it takes for the soundwave signal to stabilize.

Furthermore, for the soundwave signal of cycle (a), front-end speech processing is also performed on the network configuration soundwave signal based on the initial value of the front-end speech processing parameter (i.e., length of the echo cancellation filter, or length of the echo cancellation filter and length of the beam forming filter).

Updating the spatial acoustic parameters corresponding to the cycle (b) to cycle (f): setting an upper limit margin and a lower limit margin for the initial spatial acoustic parameter, and selecting a numerical value within the range of the lower limit margin and upper limit margin as the updated spatial acoustic parameter value. For the soundwave signals of cycles (b) to (f), the corresponding spatial acoustic parameters are $P_2$, $P_3$, . . . , $P_6$ in order.

It should be understood that a stepwise increasing method may be adopted to determine the numerical value of the updated spatial acoustic parameter $P_{n+1}$ such that the numerical value of $P_{n+1}$ satisfies $(P_{initial}-M_1)\leq P_n\leq P_{n+1}$.

It should be understood that a stepwise decreasing method may also be adopted to determine the numerical value of the updated spatial acoustic parameter $P_{n+1}$ such that the numerical value of $P_{n+1}$ satisfies $P_{n+1}\leq P_n\leq(P_{initial}+M_2)$.

It should be understood that a stepwise refinement method with a fixed-step size may also be adopted to determine the numerical value of the spatial acoustic parameter $P_{n+1}$ in the next cycle, and the numerical value of the spatial acoustic parameter $P_{n+1}$ in the next cycle is determined based on the predetermined lower limit margin $M_1$ and a step size S, wherein $P_{n+1}=P_{initial}-M_1+(n-1)\ast S$; or the numerical value of the spatial acoustic parameter $P_{n+1}$ in the next cycle is determined based on the predetermined upper limit margin $M_2$ and the step size S, wherein $P_{n+1}=P_{initial}+M_1-(n-1)\ast S$.

Updating the filter lengths corresponding to the soundwave signals of cycle (b) to cycle (f): after acquisition of the spatial acoustic parameter in each cycle, the spatial acoustic parameter is used to update the length of the echo cancellation filter, or the length of the echo cancellation filter and the length of the beam forming filter. By way of example and not limitation, the length of the echo cancellation filter and the length of the beam forming filter are positively related to the spatial acoustic parameter. Furthermore, the length of the echo cancellation filter and the length of the beam forming filter may be proportional to the spatial acoustic parameter. For example, the lengths of both the echo cancellation filter and the beam forming filter are: sampling rate of smart devices fs (unit/s) multiplies spatial acoustic parameter (unit/s). Generally, the sampling rate of smart devices fs=16000/s, for example, when the spatial acoustic parameter is 600 ms, then correspondingly, both of the length of the echo cancellation filter and the length of the beam forming filter are 16000/s×0.6 s=9600.

It should be understood that the length of a filter will have a greater impact on the signal processing effect. Too long a filter length may lead to the production of new noise, such as musical noise, while too short a filter length may affect the algorithm performance.

Front-end speech processing of the soundwave signals of cycle (b) to cycle (f): for the soundwave signals of cycle (b) to cycle (f), based on the updated front-end speech processing parameters, performing front-end speech processing on the network configuration soundwave signal. Wherein, the front-end speech processing comprises echo cancellation, that is, filtering the speech signal through the echo cancellation filter, and the front-end speech processing parameter includes the length of the echo cancellation filter. Furthermore, if the smart device uses a plurality of microphones or a microphone array, then the front-end speech processing of the smart device further comprises beam forming, that is, filtering the speech signal through the beam forming filter. It should be understood that at this time, the front-end speech processing parameter further comprises the length of the beam forming filter. It should be understood that usual echo cancellation algorithms such as NLMS, LMS, etc. may be used for the front-end speech processing. The usual beam forming algorithms such as MVDR, GSC, DSB, etc. may be used for the front-end speech processing.

Energy calculation of the soundwave signals of cycle (b) to cycle (f): for the soundwave signals of cycle (b) to cycle (f), using the corresponding updated front-end speech processing parameters to calculate the energy of the signals, thereby calculating the energy value of each cycle. That is, the energy value of each cycle corresponds to different acoustic parameters and the front-end speech processing parameters. It should be understood that the method of calculating the energy value of each cycle is mainly implemented by accumulating, accumulating and averaging, or first-order recursive smoothing of the amplitudes of the signal of the sampling cycles.

Determination of final spatial acoustic parameter: determining a minimum value $E_{min}$ among the soundwave signal energy values in the network configuration soundwave signal of cycle (b) to cycle (f), and taking the spatial acoustic parameter in the cycle corresponding to the minimum value $E_{min}$ as the final spatial acoustic parameter. For example, if the minimum value is the energy value of the network configuration soundwave signal of cycle (b), then taking the spatial acoustic parameter $P_2$ corresponding to cycle (b) as the final spatial acoustic parameter.

It should be understood that if the minimum energy value is the energy value of the network configuration soundwave signal of cycle (a), then the final spatial acoustic parameter may be derived from the initial value of the front-end speech processing parameter, that is, from the basis that the front-end speech processing parameter is proportional to the spatial acoustic parameter.

Scenario 3: Back-End Speech Recognition Optimization

Acoustic model update and speech recognition: the final spatial acoustic parameter is transmitted to the speech recognition engine stored locally or in the cloud, and the speech recognition engine selects, from a plurality of acoustic models, an acoustic model trained by using a data set closest to the final spatial acoustic parameter as a far-field speech recognition model.

Compared with traditional methods, the present application integrates two independent modules of spatial acoustic test and speech recognition algorithm performance optimization, estimates the spatial acoustic parameter through the spatial acoustic test, and then progressively refines by an algorithm to obtain the final acoustic parameter. Meanwhile, the obtained spatial acoustic parameter is used to retrieve a matched recognition engine on the cloud. This method has better performance compared to existing methods. On the one hand, it increases the correctness of mathematical modeling of the acoustic front-end algorithm; on the other hand, it improves the matching degree of the acoustic model training data set, and thus comprehensively improves the performance of the far-field speech interaction system.

Figure 3:
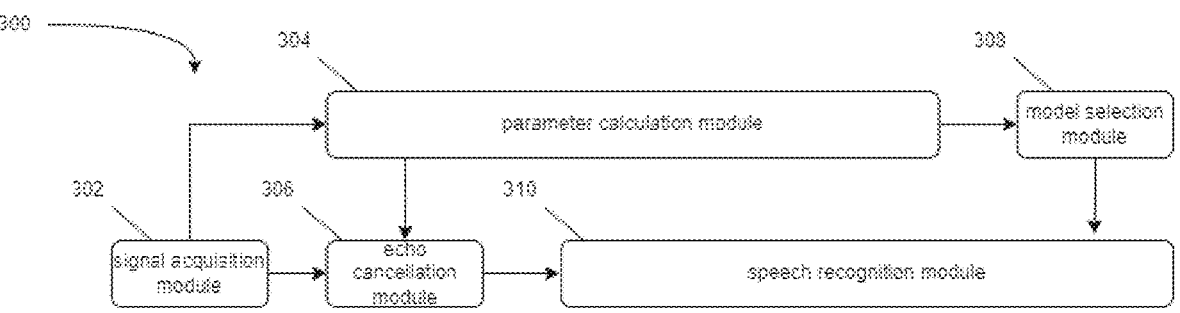
FIG. 3 is a block diagram of a far-field speech interaction system 300 according to an embodiment of the present disclosure.

FIG. 3 illustrates a far-field speech interaction system 300 according to one embodiment. As shown in FIG. 3, the far-field speech interaction system 300 is configured to include: a signal acquisition module 302, a parameter calculation module 304, an echo cancellation module 306, a model selection module 308 and a speech recognition module 310, and these modules are coupled to each other. Wherein, the signal acquisition module 302 is configured for receiving a network configuration soundwave signal in the process of network configuration. The echo cancellation module 306 is configured for performing echo cancellation processing on the network configuration soundwave signal using an echo cancellation algorithm. The parameter calculation module 304 is configured for determining a spatial acoustic parameter based on the network configuration soundwave signal; The model selection module 308 is configured for selecting a far-field speech recognition model based on the spatial acoustic parameter. The speech recognition module 310 is configured for receiving the network configuration soundwave signal processed by the echo cancellation module, and performing recognition analysis on the speech information based on the far-field speech recognition model selected by the model selection module. Further, the echo cancellation module 306 acquires a spatial acoustic parameter from the parameter calculation module 304, and determines the length of the echo cancellation filter based on the spatial acoustic parameter.

Figure 4:
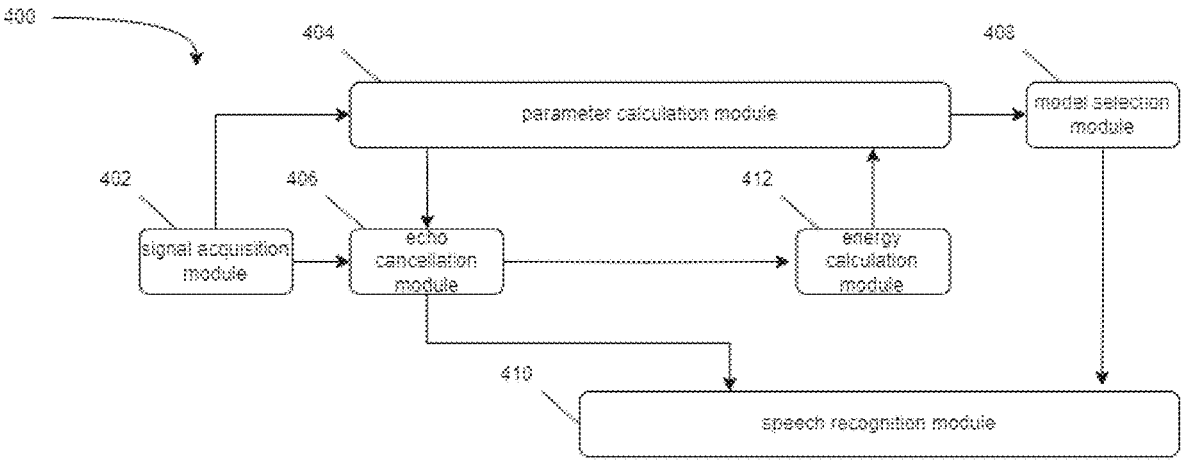
FIG. 4 is a block diagram of a far-field speech interaction system 400 according to an embodiment of the present disclosure.

Furthermore, FIG. 4 illustrates a far-field speech interaction system 400 in one embodiment. As shown in FIG. 4, the far-field speech interaction system 400 is configured to include: a signal acquisition module 402, a parameter calculation module 404, an echo cancellation module 406, a model selection module 408 and a speech recognition module 410, and the modules are coupled to each other. Wherein, the signal acquisition module 402 is configured for receiving a network configuration soundwave signal in the process of network configuration. The echo cancellation module 406 is configured for performing echo cancellation processing on the network configuration soundwave signal using an echo cancellation algorithm. The parameter calculation module 404 is configured for determining a spatial acoustic parameter based on the network configuration soundwave signal. The model selection module 408 is configured for selecting a far-field speech recognition model based on the spatial acoustic parameter. The speech recognition module 410 is configured for receiving the network configuration soundwave signal processed by the echo cancellation module, and performing recognition analysis on the speech information based on the far-field speech recognition model selected by the model selection module. Furthermore, the echo cancellation module 406 acquires a spatial acoustic parameter from the parameter calculation module 404, and determines the length of the echo cancellation filter based on the spatial acoustic parameter. The far-field speech interaction system 400 further comprises an energy calculation module 412 for calculating the energy value of the network configuration soundwave signal; wherein the energy calculation module 412 acquires the length of the echo cancellation filter from the echo cancellation module and the network configuration soundwave signal processed by the echo cancellation module, and calculates the energy value of the network configuration soundwave signal.

Furthermore, the parameter calculation module 404 acquires energy values of a plurality of network configuration soundwave signals from the energy calculation module 412; determines the minimum energy value in the energy calculation module, and set the spatial acoustic parameter corresponding to the minimum energy value as the final spatial acoustic parameter.

It should be understood that the operation of the parameter calculation module 404, the model selection module 408, and the energy calculation module 412 are triggered each time the smart device initiates the network configuration process.

Furthermore, the model selection module further includes: acquiring a final spatial acoustic parameter from the parameter calculation module 404, and based on the final spatial acoustic parameter, selecting an acoustic model trained by using a data set closest to the final spatial acoustic parameter as a far-field speech recognition model.

Figure 5:
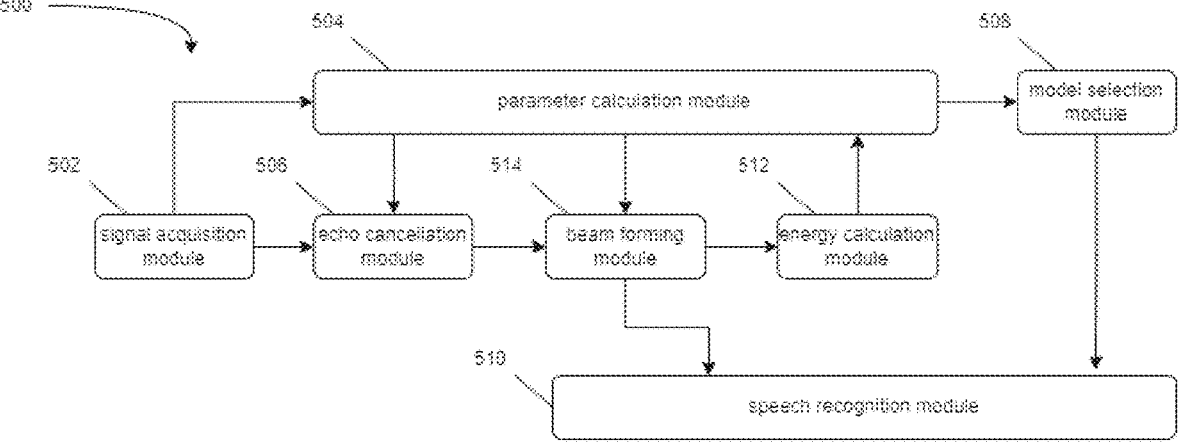
FIG. 5 is a block diagram of a far-field speech interaction system 500 according to an embodiment of the present disclosure.

Furthermore, FIG. 5 illustrates a far-field speech interaction system 500 in one embodiment. As shown in FIG. 5, the far-field speech interaction system 500 is configured to include: a signal acquisition module 502, a parameter calculation module 504, an echo cancellation module 506, a beam forming module 514, a model selection module 508 and a speech recognition module 510, and the modules are coupled with each other. Wherein, the signal acquisition module 502 is configured for receiving a network configuration soundwave signal in the process of network configuration, and the signal acquisition module 502 is a microphone array. The echo cancellation module 506 is configured for performing echo cancellation processing on the network configuration soundwave signal using an echo cancellation algorithm. The beam forming module 514 is configured for performing beam forming processing on the network configuration soundwave signal processed by the echo cancellation module by using a beam forming algorithm. The parameter calculation module 504 is configured for determining a spatial acoustic parameter based on the network configuration soundwave signal. The model selection module 508 is configured for selecting a far-field speech recognition model based on the spatial acoustic parameter. The speech recognition module 510 is configured for receiving the network configuration soundwave signal processed by the beam forming module, and performing recognition analysis on the speech information based on the far-field speech recognition model selected by the model selection module. Furthermore, the echo cancellation module 506 and the beam forming module 514 acquire a spatial acoustic parameter from the parameter calculation module 504, and determine the length of the echo cancellation filter and the length of the beam forming filter based on the spatial acoustic parameter. The far-field speech interaction system 500 further comprises an energy calculation module 512 for calculating the energy value of the network configuration soundwave signal; wherein the energy calculation module 512 acquires the length of the beam forming filter and the network configuration soundwave signal processed by the beam forming module from the beam forming module, and calculates the energy value of the network configuration soundwave signal.

Furthermore, the parameter calculation module 504 acquires energy values of a plurality of network configuration soundwave signals from the energy calculation module 512; determines the minimum energy value in the energy calculation module, and set the spatial acoustic parameter corresponding to the minimum energy value as the final spatial acoustic parameter.

Furthermore, the model selection module further includes: acquiring a final spatial acoustic parameter from the parameter calculation module 504, and based on the final spatial acoustic parameter, selecting an acoustic model trained by using a data set closest to the final spatial acoustic parameter as a far-field speech recognition model.

However, it should be understood that the implementation of the present application is not limited thereto. The various components of the far-field speech interaction system in various embodiments of the present application may adopt connection configurations different from those shown.

As an example of a specific embodiment, a specific application example is described below:

The smart device receives the network configuration soundwave signals in a total of 6 cycles (a)-(f). Each cycle is of equal length and may be set to a fixed duration, such as one minute. The length of each cycle may also be set such that the time it takes to complete one spatial acoustic parameter calculation is counted as one cycle. In this example, a total of 6 cycles of network configuration soundwave signals are received. It should be understood that, theoretically, the more cycles there are, the more accurate the spatial acoustic parameter obtained.

As the smart device receives the cycle (a) signal, based on the received cycle (a) signal, the steady noise cut-off method is adopted to calculate the spatial acoustic parameter RT60=600 ms (i.e., the initial spatial acoustic parameter $P_{initial}$). Meanwhile, the energy of soundwave signal in the cycle (a) is obtained as $E_1$ when applying the steady noise cut-off method for calculation. Wherein, the length of the echo cancellation filter and the length of the beam forming filter use the default values configured in the smart device.

A margin (e.g., 120 ms) is added to the initial spatial acoustic parameter $P_{initial}$ to update the spatial acoustic parameter $P_2$ to RT60=600 ms+120 ms=720 ms.

Using the spatial acoustic parameter $P_2$=720 ms to update the length of the echo cancellation filter and the length of the beam forming filter. Both the lengths of the two filters are 16000/s×0.72 s=11520, wherein the sampling rate fs=16000/s.

Then, using the updated echo cancellation filter and beam forming filter to perform front-end speech processing on the signal of cycle (b), and calculating the energy of the signal of cycle (b) after front-end processing to obtain $E_2$.

Again, updating the spatial acoustic parameter $P_3$, and $P_2$ is updated to RT60=660 ms (in a descending manner).

Using the spatial acoustic parameter $P_3$=660 ms to update the length of the echo cancellation filter and the length of the beam forming filter. Both the lengths of the two filters are 16000/s×0.66 s=10560, wherein the sampling rate fs=16000/s.

Then, using the updated echo cancellation filter and beam forming filter to perform front-end speech processing on the signal of cycle (c), and calculating the energy of the signal of cycle (c) after front-end processing to obtain $E_3$.

By analogy, continuing to update the spatial acoustic parameters $P_3$, $P_4$, . . . , $P_6$, and accordingly updating the length of the echo cancellation filter and the length of the beam forming filter, as well as calculating the energy values of the signals for each cycle after front-end processing.

Finally, the energy values of the signals of 6 cycles are obtained, and the spatial acoustic parameter corresponding to the cycle with the smallest energy value is the finally determined spatial acoustic parameter (i.e., room reverberation coefficient RT60), and the final spatial acoustic parameter is used to determine the final length of the echo cancellation filter and the final length of the beam forming filter. It should be understood that the acoustic parameter and filter parameter corresponding to the cycle with the smallest energy value most closely match the acoustic characteristics of the room. For example, the acoustic path of echo cancellation and the spatial acoustic parameters match the best, and thus the effect of the front-end signal processing is the best.

It should be understood that the spatial acoustic parameter for each update may be selected within a set margin range. For example, the update method may adopt a stepwise decreasing method to sequentially reduce the acoustic parameters by 5%. This solution uses a stepwise refinement calculation process to select the one with the best performance among a plurality of acoustic parameters, and determine the filter lengths based on the optimal acoustic parameter.

The final spatial acoustic coefficient obtained from the local end are transmitted to the cloud. After obtaining this information, the cloud updates the acoustic model on the platform and selects an acoustic model trained by a data set with similar spatial acoustic coefficient.

In this example, a plurality of acoustic models with acoustic parameter RT60=0.1:0.1:2 (starting at 0.1, with a step size of 0.2, and ending at 2) are deployed in the cloud, respectively, that is, the spatial acoustic models with spatial acoustic parameter of 0.1, 0.2, 0.3, 0.4, . . . , 1.9, 2.0. After the calculation of the above 6 cycles, the final spatial acoustic parameter RT60=0.76 s is closest to 0.8, and thus the acoustic model with RT60=0.8 is selected.

As an example of a specific embodiment, another specific application example is described below:

The present application conducted experiments inside a reverberation chamber with a length of 8 meters, a width of 4 meters, and a height of 3 meters, in which the smart device used the ESP-Korvo dual-mic development board of ESPRESSIF SYSTEMS CO., LTD and the development board was placed in the center of the chamber and at a height of 1.5 meters from the floor. By updating the spatial acoustic parameter in the soundwave network configuration stage, compared with the existing methods, the echo cancellation module of this smart device is able to improve the signal-to-return ratio by 5.2 db, and the beam forming module is able to improve the signal-to-interference ratio by 2.6 db. Meanwhile, the speech recognition rate of speech recognition was tested. Acoustic models with acoustic parameter RT60=0.1:0.1:2 were deployed in the cloud, respectively, and the final spatial acoustic parameter obtained was RT60=0.76 s. In the test scenario of a three-meter and quiet scenario, after updating the spatial acoustic parameter through the solution of the present application, the final speech recognition rate was improved by 3.6% relative to other engines.

The above embodiments provide specific operating processes and steps by way of example, but it should be understood that the protection scope of the present application is not limited thereto.

According to the methods and devices disclosed in the present application, as an optional implementation method, the steps of any method in the above specific embodiments may be executed using a computer program and stored on a computer-readable storage medium.

While various embodiments of aspects of the application have been described for the purposes of this disclosure, it should not be understood as limiting the teachings of the present disclosure to these embodiments. Features disclosed in one specific embodiment are not limited to this embodiment, but may be combined with features disclosed in different embodiments. Furthermore, it should be understood that the steps of method described above may be performed sequentially, performed in parallel, combined into fewer steps, split into more steps, combined in a different manner than described and/or omitted. Those skilled in the art should understand that there are many more optional implementations and variations possible, and various changes and modifications may be made to the above components and configurations without departing from the scope of the application as defined by the claims.

What is claimed is:

1. A method for improving far-field speech interaction performance, the method applied to a smart device having a microphone, and comprising: cyclically performing steps S1 to S6 by N times, wherein N is a natural number not less than 2:

step S1: receiving, by the microphone, a network configuration soundwave signal of a predetermined length of time during a network configuration process of the smart device;

step S2: performing front-end speech processing on the network configuration soundwave signal based on a front-end speech processing parameter; wherein the front-end speech processing comprises echo cancellation, and the front-end speech processing parameter comprises a length of an echo cancellation filter;

step S3: calculating an energy value $E_n$ of the network configuration soundwave signal processed by the front-end speech processing in step S2 within the current cycle;

step S4: determining whether the current cycle is a first cycle, and in response to that the current cycle is the first cycle, calculating an initial spatial acoustic parameter $P_{initial}$ based on the network configuration soundwave signal received in step S1, and proceeding to step S5; and in response to that the current cycle is not the first cycle, proceeding directly to step S5;

step S5: determining a numerical value of a spatial acoustic parameter $P_{n+1}$ in a next cycle by combining a preset upper limit margin and a preset lower limit margin of the smart device, such that the numerical value of $P_{n+1}$ satisfies $(P_{initial}-M_1) \leq P_{n+1} \leq (P_{initial}+M_2)$, wherein n is a sequence number of the current cycle, $M_1$ is the preset lower limit margin, and $M_2$ is the preset upper limit margin;

step S6: updating the front-end speech processing parameter using the spatial acoustic parameter $P_{n+1}$ obtained in step S5 for the next cycle;

after that the N cycles are completed, proceeding to step S7: determining a minimum value $E_{min}$ among the network configuration soundwave signal energy values obtained in the N cycles, and taking a spatial acoustic parameter in the cycle corresponding to the minimum value $E_{min}$ as a final spatial acoustic parameter; wherein the final spatial acoustic parameter is configured to update the length of the echo cancellation filter of the smart device to improve the far-field speech interaction performance.

2. The method according to claim 1, wherein the front-end speech processing parameter further comprises a length of a beam forming filter.

3. The method according to claim 1, wherein step S2 comprises: determining whether the current cycle is a first cycle, and in response to that the current cycle is the first cycle, performing front-end speech processing on the network configuration soundwave signal based on an initial value of the front-end speech processing parameter; and in response to that the current cycle is not the first cycle, performing front-end speech processing on the network configuration soundwave signal based on the front-end speech processing parameter updated in a previous cycle.

4. The method according to claim 1, wherein step S3 further comprises determining whether the current cycle is a Nth cycle, and in response to that the current cycle is the Nth cycle, proceeding to step S7.

5. The method according to claim 1, further comprising: transmitting the final spatial acoustic parameter to a speech recognition engine stored locally or in a cloud, and selecting, by the speech recognition engine and from a plurality of acoustic models, an acoustic model trained by using a data set closest to the final spatial acoustic parameter as a far-field speech recognition model.

6. The method according to claim 1, wherein the step S5 comprises: determining a numerical value of a spatial acoustic parameter $P_{n+1}$ in a next cycle by a stepwise increasing method, such that the numerical value of $P_{n+1}$ satisfies $(P_{initial}-M_1) \leq P_n \leq P_{n+1}$.

7. The method according to claim 1, wherein the step S5 comprises: determining a numerical value of a spatial acoustic parameter $P_{n+1}$ in a next cycle by a stepwise decreasing method, such that the numerical value of $P_{n+1}$ satisfies $P_{n+1} \leq P_n \leq (P_{initial}+M_2)$.

8. The method according to claim 1, wherein the step S5 comprises: determining a numerical value of a spatial acoustic parameter $P_{n+1}$ in a next cycle by a stepwise refining method with a fixed-step size, wherein a numerical value of the spatial acoustic parameter $P_{n+1}$ in the next cycle is determined based on the preset lower limit margin $M_1$ and a step size S, wherein $P_{n+1}=P_{initial}-M_1+(n-1)*S$.

9. The method according to claim 1, wherein the spatial acoustic parameter is a room reverberation coefficient.

10. The method according to claim 1, wherein in step S4, the calculating an initial spatial acoustic parameter $P_{initial}$ comprises: calculating the initial spatial acoustic parameter $P_{initial}$ by a steady noise cut-off method.

11. The method according to claim 1, wherein in step S6, the updating the front-end speech processing parameter comprises: updating the length of the echo cancellation filter to a value that is positively correlated with the spatial acoustic parameter obtained in step S5.

12. The method according to claim 2, wherein in step S6, the updating the front-end speech processing parameter further comprises: updating the length of the beam forming filter to a value that is positively correlated with the spatial acoustic parameter obtained in step S5.

13. The method according to claim 1, wherein a network configuration soundwave signal energy value $E_1$ calculated in the first cycle corresponds to a spatial acoustic parameter $P_1$, wherein $P_1$ is determined based on an initial value of the front-end speech processing parameter.

14. A non-transitory computer-readable storage medium with a computer program stored thereon, wherein when executed by a processor, the computer program causes the processor to cyclically perform steps S1 to S6 by N times, wherein N is a natural number not less than 2:

step S1: receiving, by a microphone of a smart device, a network configuration soundwave signal of a predetermined length of time during a network configuration process of the smart device;

step S2: performing front-end speech processing on the network configuration soundwave signal based on front-end speech processing parameter, wherein the front-end speech processing comprises echo cancellation, and the front-end speech processing parameter comprises a length of an echo cancellation filter;

step S3: calculating an energy value $E_n$ of the network configuration soundwave signal processed by the front-end speech processing in step S2 within the current cycle;

step S4: determining whether the current cycle is a first cycle, and in response to that the current cycle is the first cycle, calculating an initial spatial acoustic parameter $P_{initial}$ based on the network configuration soundwave signal received in step S1, and proceeding to step S5; and in response to that the current cycle is not the first cycle, proceeding directly to step S5;

step S5: determining a numerical value of a spatial acoustic parameter $P_{n+1}$ in a next cycle by combining a preset upper limit margin and a preset lower limit margin of the smart device, such that the numerical value of $P_{n+1}$ satisfies $(P_{initial}-M_1) \leq P_{n+1} \leq (P_{initial}+M_2)$, wherein n is a sequence number of the current cycle, $M_1$ is the preset lower limit margin, and $M_2$ is the preset upper limit margin;

step S6: updating the front-end speech processing parameter using the spatial acoustic parameter $P_{n+1}$ obtained in step S5 for the next cycle;

after that the N cycles are completed, proceeding to step S7: determining a minimum value $E_{min}$ among the network configuration soundwave signal energy values obtained in the N cycles, and taking a spatial acoustic parameter in the cycle corresponding to the minimum value $E_{min}$ as a final spatial acoustic parameter; wherein the final spatial acoustic parameter is configured to update the length of the echo cancellation filter to improve far-field speech interaction performance.

15. A terminal device comprising:

a microphone;

a processor; and a memory;

wherein the memory is configured to store a computer program, which, when executed by the processor, causes the processor to cyclically perform steps S1 to S6 by N times, wherein N is a natural number not less than 2:

step S1: receiving, by the microphone, a network configuration soundwave signal of a predetermined length of time during a network configuration process of the terminal device;

step S2: performing front-end speech processing on the network configuration soundwave signal based on front-end speech processing parameter; wherein the front-end speech processing comprises echo cancellation, and the front-end speech processing parameter comprises a length of an echo cancellation filter;

step S3: calculating an energy value $E_n$ of the network configuration soundwave signal processed by the front-end speech processing in step S2 within the current cycle;

step S4: determining whether the current cycle is a first cycle, and in response to that the current cycle is the first cycle, calculating an initial spatial acoustic parameter $P_{initial}$ based on the network configuration soundwave signal received in step S1, and proceeding to step S5; and in response to that the current cycle is not the first cycle, proceeding directly to step S5;

step S5: determining a numerical value of a spatial acoustic parameter $P_{n+1}$ in a next cycle by combining a preset upper limit margin and a preset lower limit margin of the terminal device, such that the numerical value of $P_{n+1}$ satisfies $(P_{initial}-M_1) \leq P_{n+1} \leq (P_{initial}+M_2)$, wherein n is a sequence number of the current cycle, $M_1$ is the preset lower limit margin, and $M_2$ is the preset upper limit margin;

step S6: updating the front-end speech processing parameter using the spatial acoustic parameter $P_{n+1}$ obtained in step S5 for the next cycle;

after that the N cycles are completed, proceeding to step S7: determining a minimum value $E_{min}$ among the network configuration soundwave signal energy values obtained in the N cycles, and taking a spatial acoustic parameter in the cycle corresponding to the minimum value $E_{min}$ as a final spatial acoustic parameter; wherein the final spatial acoustic parameter is configured to update the length of the echo cancellation filter to improve far-field speech interaction performance.

16. The method according to claim 1, wherein the step S5 comprises: determining a numerical value of a spatial acoustic parameter $P_{n+1}$ in a next cycle by a stepwise refining method with a fixed-step size, wherein a numerical value of a spatial acoustic parameter $P_{n+1}$ in a next cycle is determined based on the preset upper limit margin $M_2$ and a step size S, wherein $P_{n+1}=P_{initial}+M_1-(n-1)*S$.

* * * * *